United States Patent [19]

Nassimbene

[11] 3,882,301

[45] May 6, 1975

[54] RETROSPECTIVE PULSE MODULATION INCLUDING BAR CODING AND APPARATUS THEREFOR

[75] Inventor: Ernie George Nassimbene, San Jose, Calif.

[73] Assignee: International Business Machines Corporation, Armonk, N.Y.

[22] Filed: July 13, 1973

[21] Appl. No.: 379,017

Related U.S. Application Data

[60] Continuation of Ser. No. 183,968, Sept. 27, 1971, abandoned, which is a division of Ser. No. 31,959, April 27, 1970, Pat. No. 3,708,748

[52] U.S. Cl.... 235/61.11 E; 235/61.11 D; 250/568; 332/9 R; 340/146.3 Z; 346/74 M

[51] Int. Cl.. G06k 9/18; G01d 15/12; G01n 21/30; G06k 7/10; H03k 7/00

[58] Field of Search235/61.11 E, 61.11 D, 61.11 R, 235/61.11 B, 61.12 R, 61.12 M, 61.12 N, 61.7 R; 340/174.1 H, 174.1 G, 146.3 Z, 168 R, 146.3 K; 346/74 M; 250/568; 332/9, 11

[56] References Cited

UNITED STATES PATENTS

| | | | |
|---|---|---|---|
| 3,374,475 | 3/1968 | Gabor | 340/168 R |
| 3,471,862 | 10/1969 | Barney | 346/74 |
| 3,482,081 | 12/1969 | Peterson | 235/61.11 R |
| 3,510,780 | 5/1970 | Beuhrle | 332/9 R |
| 3,543,241 | 11/1970 | Leuck | 235/61.11 E |
| 3,636,317 | 1/1972 | Torrey | 235/61.12 N |
| 3,643,068 | 2/1972 | Mohan | 235/61.11 E |
| 3,671,722 | 6/1972 | Christie | 235/61.12 N |
| 3,699,312 | 10/1972 | Jones | 235/61.11 E |
| 3,700,858 | 10/1972 | Murthy | 235/61.11 E |
| 3,701,097 | 10/1972 | Wolff | 340/146.3 Z |
| 3,723,710 | 3/1973 | Crouse | 235/61.11 E |
| 3,778,597 | 12/1973 | Vanderpool | 235/61.11 E |
| 3,783,244 | 1/1974 | Kapsambelis | 235/61.11 E |
| 3,783,245 | 1/1974 | Howell | 235/61.11 E |

*Primary Examiner*—Daryl W. Cook
*Assistant Examiner*—Robert M. Kilgore
*Attorney, Agent, or Firm*—George E. Roush

[57] ABSTRACT

Digital data in self-timing reference is free from error due to irregular data spacing because of variations in speed and/or direction of scan in manual or machine applications with a pulse modulation of retrospective nature. Initially reference data manifestations are established and thereafter digital data are established partly on the basis of preceding manifestations of the data. In a binary data translating system, for example, a pair of reference pulses are spaced apart by a given interval. A binary unit is thereafter manifested by a pulse following at the same or similar interval and a binary zero is manifested by a pulse following at a differing interval. Each manifestation of a binary number thereafter depends on the interval between preceding pulses. A principle advantage of retrospective pulse modulation lies in demodulation. Large variations in the spacing and relatively larger variations in the scanning speed are accommodated readily. Magnetic tape and like records can not only be addressed at conventional high speeds in searching and at conventional low speeds later used in reproducing but, also can be searched continuously as the change is made between those speeds. Adaptive rate communications are particularly enhanced by the principle. Optical scanning of bar codes is improved by differing the spacing of uniform width bars or with bars of differing widths and differing spacing. These arrangements are applicable to railroad car and like object identifying, label data processing, human identification, card data processing, graphic display data probing systems and many other uses. Synchronous and asynchronous capability permits input to almost any digital data processing system.

19 Claims, 9 Drawing Figures

INVENTOR
ERNIE G. NASSIMBENE

ATTORNEY

RETROSPECTIVE PULSE MODULATION INCLUDING BAR CODING AND APPARATUS THEREFOR

This is a continuation, of application Ser. No. 183,968 filed on the 27th day of Sept. 1971, which application was a division of an application Ser. No. 31,959, filed on the 27th day of Apr. 1970.

The instant U.S. Pat. application and another Ser. No. 183,839 were divided from that U.S. Pat. application Ser. No. 31,959 filed on the 27th day of Apr. 1970 and thereafter issued on the 2nd day of Jan. 1973, as U.S. Pat. No. 3,708,748, later divisional application Ser. No. 292,006 issued on the 16th day of Apr. 1974 as U.S. Pat. No. 3,805,175.

The invention relates to digital data handling systems, and it particularly pertains to methods of modulating and demodulating a signal pulse series, together with modem apparatus therefor, although, it is not limited thereto.

The art of digital data information handling has progressed for decades to a level at which there are available a number of excellent modulating and demodulating systems and appropriate apparatus for setting up and operating those systems. Each system as thus far developed has advantages and disadvantages. Digital data transmission and processing is especially well handled by a relatively large number of pulse modulation systems; each system has definite advantages for certain purposes and conversely frequently has disadvantages for other systems.

The most serious shortcomings in conventional apparatus stem from the necessity for timing and reference apparatus operating in conjunction with the modulating and demodulating (Modem) apparatus. Prior art suggestions for reducing the Modem and clocking apparatus in several digital information handling systems are reflected in the following U.S. Pat. No.

| | | | |
|---|---|---|---|
| 2,530,081 | 11/1950 | Ross | 250–27 |
| 2,612,994 | 10/1952 | Woodland et al | 209–111 |
| 2,633,564 | 3/1953 | Fleming, Jr. | 340–174 |
| 3,020,526 | 2/1962 | Ridler et al | 340–174.1 |
| 3,106,706 | 10/1963 | Kolanowski et al | 340–345 |
| 3,142,806 | 7/1964 | Fernandez | 329–107 |
| 3,145,291 | 8/1964 | Brainerd | 235–1.11 |
| 3,166,712 | 1/1965 | Graham | 325–321 |
| 3,212,014 | 10/1965 | Wiggins et al | 329–107 |
| 3,292,489 | 12/1966 | Johnson et al | 88–24 |
| 3,409,760 | 11/1968 | Hamisch et al | 255–61.12 |
| 3,413,447 | 11/1968 | LaMers | 235–61.6 |
| 3,417,234 | 12/1968 | Sundblad | 235–61.11 |
| 3,418,456 | 12/1968 | Hamich et al | 235–61.11 |
| 3,474,191 | 10/1969 | Frohbach et al | 178–6 |
| 3,474,234 | 10/1969 | Rieger et al | 235–61.11 |

And in the technical literature:

E. G. Nassimbene, "Voicing Detector", March 1965, pp. 923–4, IBM Technical Disclosure Bulletin, Vol. 7, No. 10;

A. Desblache, "Coding Device for Delta Modulation," February 1968, pp 1424–5, IBM Technical Disclosure Bulletin, Vol. 10, No. 9; and G. A. Hellworth & G. D. Jones, "Push-Pull Feedback Delta Modulator", December 1968, pp 877–8, IBM Technical Disclosure Bulletin, Vol. 11, No. 7.

The above listed patents to Woodland and Silver; to La Mers; to Rieger, Kern and Utzinger; to Piaza and Ernst; to Hamisch; to Hamisch and Kern; and to Kolanowski are directed to bar coding systems and/or labels of the prior art. The first six are concerned with pulse width coding arrangements which may appear at first glance to be closely similar to the coding of the invention but which bear no retrospective nature as will be brought out. The patent to Brainerd is directed to a color bar coding and decoding scheme which has no retrospective nature.

The remaining patents and publications listed as well as those just commented on are directed mainly to devices and/or circuitry which may appear quite closely similar to that of the invention, but are for reading tags and labels of these and other pulse width type codes and/or demodulating waveforms of similar modulation but having no retrospective nature as will develop. The arrangement in the Nassimbene publication does detect equal and unequal spacings as in RPM coding but is directed to the analysis of voice and voicing speech sounds in contradistinction to the novel coding and circuitry of the invention as will be evident.

The objects referred to indirectly hereinbefore and those that will appear as the specification progresses are attained in methods of modulating and demodulating a series of discrete manifestations spaced for representing data in accordance with previous spacing of manifestations for conveying information. In one embodiment according to the invention, binary data comprising naughts and units are represented in a series of pulses spaced in progression as the data is arranged. For example, a start pulse is generated and at a given time interval thereafter, an initial reference pulse is generated. One binary character, for example, the binary unit, or number 1, is thereafter manifested by a pulse spaced substantially at the same interval as between the initial and reference pulses. A binary naught, or $\phi$ (zero), is then denoted by a further pulse following the last pulse by an interval different from the spacing between the preceding pulses. Preferably, the different spacing is of the order of 2:1; for example, a binary unit may be manifested by three pulses in series with equidistant spacing between the succeeding pulses and a binary naught would be manifested by three pulses appearing in series with a spacing between two of the pulses twice as great as that between one of the previous pulses and the succeeding pulse. The manifestation, or coding, of the binary data, after the start and reference pulses, is on a single pulse per character but the value or identity of that character is dependent on the manifestation of the previous value or character. Thus, a pulse denoting one binary character is established after two succeeding spacings substantially equal to each other and the other binary character is effected by a pulse occurring after two other pulses spaced by substantially different spacings but without regard to the order of the occurrence of the different spacings.

According to the invention, a basic modulator for retrospective pulse modulation comprises a generator forming pulses at substantially equal intervals and a modulator arranged to blank a single pulse at those intervals requisite for manifesting a character by a wider spacing between pulses in relationship to spacing between the two preceding pulses. Alternately, a pulse may be inserted intermediately of two succeeding pulses delivered by the generator.

Basically a demodulator for a restrospective pulse modulated signal comprises a pair of identical circuits for measuring the spacing between pulses, a switching arrangement enabling the measuring circuits alternately, and a comparing circuit for comparing the measurements on an equals-not equals basis. A bistable reciproconductive circuit, a pair of resistor-capacitor integrating circuits, and a differential amplifying circuit of conventional form may be arranged for this purpose. Presetting of the measuring circuits basically is accomplished by differentiating circuits effective at the beginning of each measuring time to discharge the capacitor and thereafter allow it to be charged in accordance with the spacing between pulses. Simple gating circuitry and a bistable reciproconductive circuit for pegging the spacing between the last succeeding pulses may be of conventional form for this basic modulator. Alternately a pulse counting arrangement may be used where the auxiliary circuitry is readily available.

An application of retrospective pulse modulation and the basic apparatus therefor is advantageous in adaptive rate transmission of telegraph signals. This type of communications system transmits in both directions and error detecting circuitry at the receiving locations afford indications of overfast transmission. The indication of overfast transmission at a receiving location is returned to the transmitting location where the location is applied to control circuitry for lowering the fundamental pulse repetition rate, preferably in prearranged steps to avoid hunting of the rate controlling circuitry.

Further according to the invention, retrospective pulse modulation affords a flexible system for searching magnetic tape at high speed in order to locate a portion or block of the tape to be reproduced at the conventional low reproducing speed. Because the spacing between pulses manifests the information, large variations in speed are readily tolerated without loss of intelligence. As the magnetic tape is moved past the electromagnetic transducer sensing the retrospective pulse modulation on the tape, conventional speed changing circuitry and apparatus are enabled in conventional manner to lower the speed of transport of the tape from the high searching speed to the relatively low reproducing speed, and stop the tape entirely if that is desired, without changing the address reading circuitry in any way.

Still further according to the invention, the principle of retrospective pulse modulation is highly advantageous in optoelectronically translating printed data into digital signals for electronic computing and data processing systems. Fundamentally, the data is printed in the form of a series of lines parallel to each other and spaced apart in a manner equivalent to the pulse train signals described above. A simple optical sensing arrangement, for example, a light source and photo diode arrangement, is passed from a starting line or bar generally normally of the series of lines with a smooth but not necessarily uniform rate. Variations in the spacing of the bars, in the speed of scanning, and in the direction or angle of crossing of the bars by the optoelectronic scan will not seriously affect the data. No synchronizing or clocking apparatus is needed so that hand-held optical scanners are practical and inexpensive. Buffering at the electronic computer or data processor is simple. This retrospective bar coding is applicable to credit card, time clock cards, admission and exiting cards and identification cards of all types. A principle advantage is that a card reader may be a small box with a slot in which the card can slide between or adjacent to optical or magnetic or mechanical sensing devices alone; no card feeding apparatus or synchronizing apparatus is necessary. Similarly, railroad freight cars can be marked with a bar code identifying the car and read by a photo-optical reader adjacent the track over a wide range of train speeds and in either the forward or reverse direction. A simple apparatus according to the invention can be used to read labels on packaged goods, tags attached to goods of conventional form except for the printing of the bar code according to the invention. A standard character generating keyboard is also contemplated for entering data with regard to objects of configuration and/or location not lending themselves to the attachment of a label convenient in size and form.

Other aspects of the invention which are contemplated include the arrangements for reading bar codes in either direction, use of a group of predetermined bars or a single character in order to protect the code and fixed length versions of protected codes in order to effect control and translation to other digital data systems. Variable length chaining arrangements and fixed length total chaining coding are contemplated.

In order that full advantage of the invention may be obtained in practice, preferred embodiments thereof, given by way of examples only, are described in detail hereinafter with reference to the accompanying drawing, forming a part of the specification, and in which.

Figure 1:
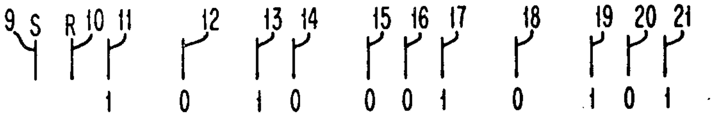
FIG. 1 is a graphical representation of binary information laid down in retrospective pulse modulation to form according to the invention.

The underlying principle of retrospective pulse modulation is illustrated in FIG. 1. Information in the form of an 11 order binary number, 10100010101 is coded in this general example. A series of parallel lines 9–21 can be considered as narrow electric pulses established at time intervals proportional to the spacing between the lines 9–21, or as printed lines or bars for optically manifesting the information desired, or as indications of raised or depressed surfaces manifesting the information for mechanical sensing, or as representations of lines of magnetic dipoles or transitions between domains of uniform polarity, or as other manifestations by physical form as will occur to those skilled in the art. A start line or bar 9 is followed at a predetermined spacing by a reference bar 10 for initiating the retrospective modulation. The first information manifesting bar 11 follows the reference 10 by a spacing substantially equal to the spacing between the start bar 9 and the reference bar 10 to manifest a binary unit; obviously a binary naught might be better manifested by this arrangement depending upon the situation facing the designer. The following bar 12 is arranged on the former basis to denote a binary naught by spacing a bar 12 substantially twice the distance from the preceding bar 11 as that bar follows the reference bar 10. In a sense the information is carried by the spacing between bars. The binary unit is set down at a time at which the spacing between the two preceding bars 9 and 10 is equal to the spacing between the bars 11 and 10. Unequal spacing of the bar 12 from the preceding bar 11 as compared to the spacing between the reference bar 10 and the bar 11 keynotes a naught. A binary unit (1) is next denoted by setting down a bar 13 at twice the spacing from the preceding bar 12 as was arranged between the start bar 9 and the reference bar 10. A bar 14 following the preceding bar 13 at a spacing smaller than the spacing between the preceding pulses 12 and 13 and equal to the spacing between the start bar 9 and the reference bar 10 will denote a binary (0) likewise a bar 15 following the preceding bar 14 by a spacing greater than that between the preceding bars 13 and 14 still denotes binary zero as will bar 16 following the bar 15 by a shorter spacing. A binary naught is denoted by a bar 18 following the preceding bar 17 by a spacing greater than the latter bar follows the earlier bar 16. A succeeding bar 19 denotes a binary unit (1) by following the preceding bar 18 by the same larger spacing as bar 18 followed the bar 17. Bars 20 and 21 denote a naught and a unit by following the bar 19 at uniform spacing. Thus, FIG. 1 gives an example of each of the possibilities of data manifestation in basic binary digit retrospective pulses modulation where the immediate preceding spacing is reflected in the spacing of the digit under consideration. It is within the contemplation of the invention that a different preceding manifestation may be used if desired. For instance, the manifestation of a binary digit might retrospectively look at not the immediately preceding pulse interval but the penultimate one, or the one before that, and so on. Indeed it is contemplated that the pulse interval to be used as a reference will be varied in a given message for a cryptograph communication system of extreme simplicity but of a high degree of security. Obviously, this approach will involve circuit delay and the like although many of the advantages of the invention will be available. Such variations in the retrospective pulse modulation system proposed will be found useful where certain delay is unavoidable or possibly advantageous in the operation of other elements of the system rather than the Modem apparatus. A collating sorter for information bearing matrix (IBM) cards is an example of such a machine for use in a system wherein delay must be accommodated but at the same time it can be overcome without losing advantages.

Figure 2:
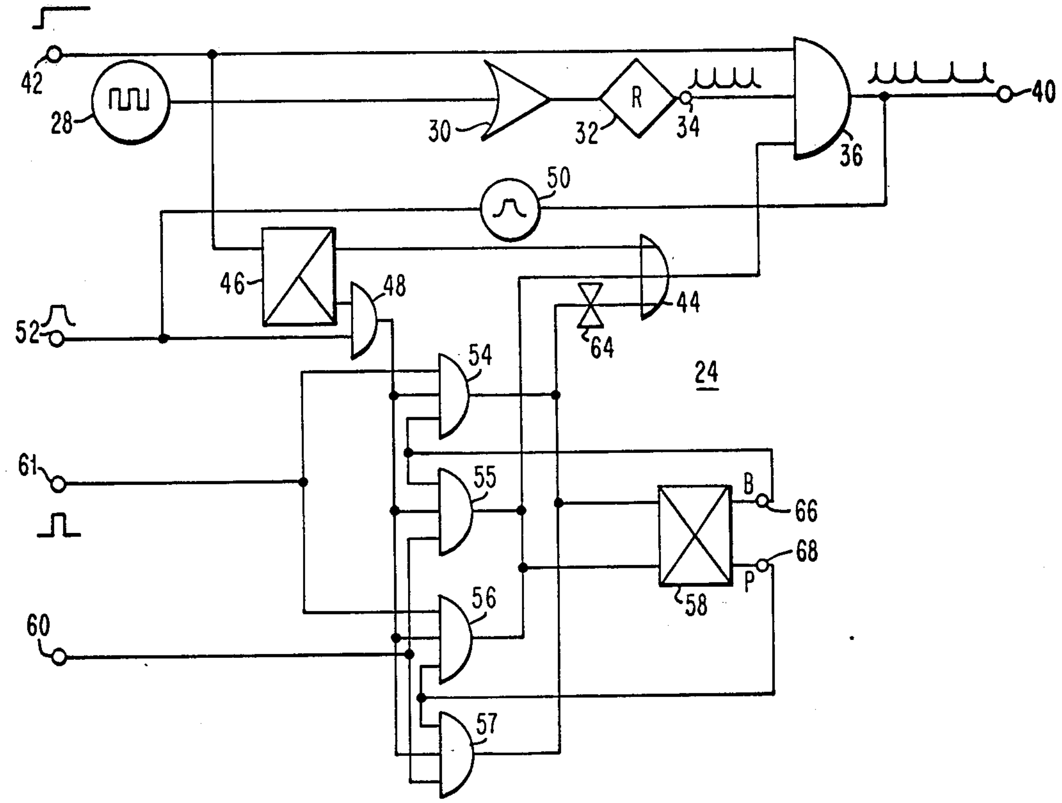
FIG. 2 is a functional diagram of a basic retrospective pulse modulator.

A basic modulating circuit arrangement 24 is shown in the functional diagram of FIG. 2. A squarewave generator 28 followed by a differentiating circuit 30 and a full wave rectifying circuit 32 produces a train of pulses at the pulse train output terminal 34 uniformly spaced one by one. These pulses are passed through an AND gate circuit 36, when it is in the enabled state to output terminals 40. The AND gating circuit 36 is armed by the application of a control voltage applied at transmitting or modulating control terminals 42, and enabled by bringing up the other lead to the AND gating circuit 36 through an OR gating circuit 44 and a monostable reciproconductive circuit 46. The reciproconductive circuit 46 has a time constant at which the AND gate 36 will be enabled for permitting the first two pulses from the terminals 34 to pass through the AND gating circuit 36 after the transmitting control terminals 42 are raised. Thus, a start and a reference pulse appear in succession at the output terminals 40.

Because of the gross inconsistency with which the terminology relating to the many types of "multivibrators" and similar circuits is used, the less frequently but much more consistently used term "reciproconductive circuit" will be used hereinafter in the interest of clarity. As employed herein, the term "reciproconductive circuit" is construed to include all dual current flow path element (including vacuum tubes, transistors and other current flow controlling devices) regenerative circuit arrangements in which current alternates in one and then the other of those elements in response to applied triggering pulses. The term "free running multivibrator" is sometimes applied to the "astable reciproconductive circuit" which is one in which conduction continuously alternates between the elements after the application of a single triggering pulse (which may be merely a single electric impulse resulting from closing a switch for energizing the circuit). Such a circuit oscillates continuously at a rate dependent on the time constants of various components of the circuit arrangement and/or the applied energized voltage. The term "monostable reciproconductive circuit" will be used to indicate such a circuit in which a single trigger is applied to a single input terminal to trigger the reciproconductive circuit to the unstable state once and return. This monostable version is sometimes called a "single-shot circuit" in the vernacular principally because of the erosion of the original term "flip-flop" and because it is shorter than the term "self-restoring flip-flop circuit" later used in an attempt to more clearly distinguish from the term "bistable flip-flop circuit" even more lately in vogue. "Bistable reciproconductive circuits" are divided into the "binary reciproconductive circuit" which has a single input terminal to which triggering pulses are applied to alternate the state of conduction each time a pulse is applied. Such a circuit is now frequently referred to as a "binary flip-flop." The "bistable reciproconductive circuit" having two input terminals between which successive triggers must be alternately applied to switch from one stable state to the other will be referred to as a "bilateral reciproconductive circuit." This version is presently familiarly called both a "flip-flop" and a "lockover circuit."

The monostable reciproconductive circuit 46 in its normal state arms a message AND gating circuit 48. The latter AND gating circuit 48 is enabled at output pulse time by a signal shaping circuit 50 arranged to generate a broadened gating pulse which is available at shift pulse output terminals 52. Gating pulses are delivered at the output of the message AND gating circuit 48 to enable four three-way AND circuits 54–57. The outputs of the AND gating circuits 54 and 57 are connected to the set terminal of a last pulse translated pegging reciproconductive circuit 58 and the reset terminal is connected to the outputs of AND gating circuits 55 and 54. AND gating circuits 54 and 55 are armed by the B (or blanking) terminal 66 of the reciproconductive circuit 58 while the AND gating circuits 56 and 57 are armed by the P (or passing) terminals 68. A naughts input terminals 60 is connected to AND gating circuit 55 and 57 for enabling them on the input of a naught signal while similarly a units input terminal 61 is connected to enable AND gating circuits 54 and 56, the input of a unit signal. An inverting circuit 64 couples the outputs of AND gating circuits 54 and 57 to the OR gating circuit 44 while the AND circuit 55 and 56 are coupled directly by the OR gating circuit 44 to the AND gating circuit 36. Pulses from the shift pulse output terminal 52 at output pulse time are delivered to a message input device (not shown) such as a shift register arrangement to gate message naughts and units to the terminals 60 and 61. The presence of a data level on terminals 61 will raise the output lines of either AND gate 54 or AND gating circuit 56, whichever is enabled by the last pulse pegging circuit 58. The pulses at terminals 34 will be blanked or passed in accordance with the status of the terminals 61 and the status of the terminals 66 and 68. Likewise, the status of terminals 60 will determine the blanking or passing of the pulse at the time the terminal 60 is brought up.

Figure 3:
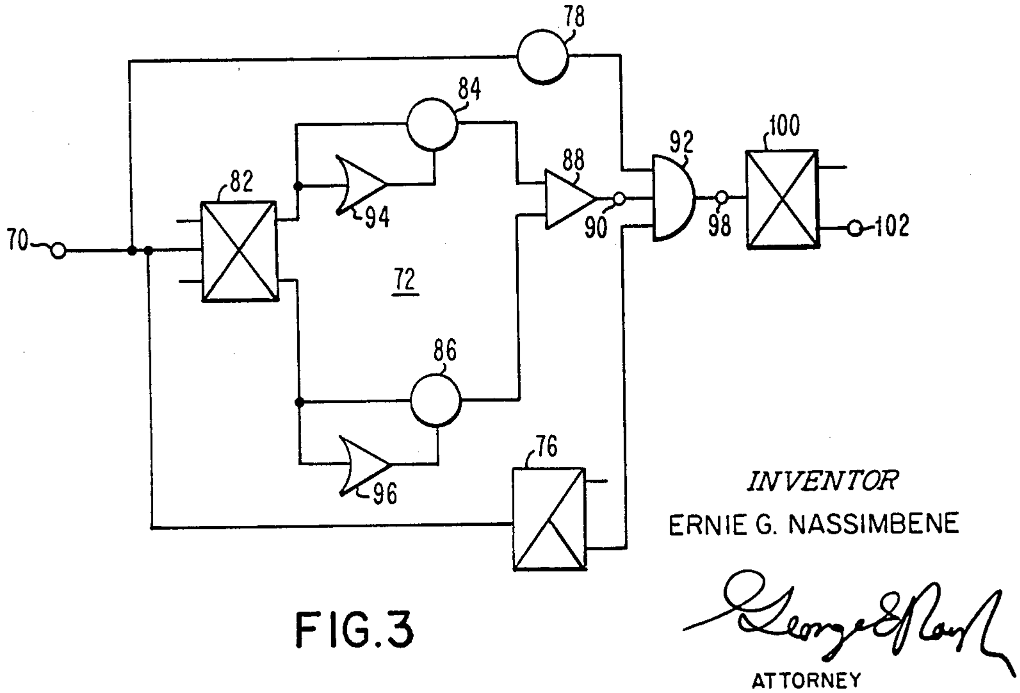
FIG. 3 is a basic retrospective pulse demodulator according to the invention.

A basic demodulator circuit 72 is shown functionally in FIG. 3. Pulses from the output terminals 40 of the modulator are applied to input terminals 70 of a basic demodulating circuit 72. The demodulator 72 comprises a monostable reciproconductive circuit 76 similar to the previously mentioned reciproconductive circuit 46 for blanking the start and reference pulses from the output. An enabling gate pulse generator 78, which may be a signal shaping circuit like that of the shift pulse generator 50, is also coupled to the input terminals 70. The heart of the demodulator 72 comprises a binary reciproconductive circuit 82 having the output terminals individually connected to ramp voltage generators 84 and 86 which are in turn coupled to a comparing circuit 88, shown here as being of the differential amplifier type having an output terminal 90 connected to an AND gating circuit 92 to which the reciproconductive circuit 76 and the gating pulse generating circuit 78 are connected. Differentiating circuits 94 and 96 are enabled as the binary reciproconductive circuit 82 switches and reset the ramp generators 84 and 86, respectively. The ramp generator 84, for example, is reset by a spike from the differentiating circuit 94 as the reciproconductive circuit 82 switches on a pulse received at the input terminal 70. The ramp generator 84 continues to rise until the reciproconductive circuit 82 switches on the succeeding pulses which permits the ramp generator 84 to hold its attained voltage level while the other ramp generator 86 functions in the same manner. Thus, one ramp generator 84 measures the spacing between alternate pairs of succeeding pulses and the other ramp generator 86 measures the spacing between the other pairs of them. At each pulse the outputs of the ramp generators 84, 86 are compared in the comparing circuit 88. If the spacings are equal, the attained voltages are substantially equal and substantially zero output appears at the comparator terminal 90. If the spacings are unequal, the ramp voltages will be unequal and an output voltage above zero will appear at the output comparator terminal 90. The levels at the output terminals 90 are converted to pulses by action of the AND gating circuit 92 at the pulse output terminals 98. If output levels are desired, a Schmitt or level distinguishing type reciproconductive circuit 100 is used as shown. The hysteresis characteristic of the Schmitt trigger circuit is of advantage in rejecting all doubtful comparisons.

The retrospective pulse modulation according to the invention is operable with asynchronous and synchronous apparatus. Where the associated apparatus is capable of delivering a train of substantially uniformly or at least similarly timed pulses, as is very often the case, demodulation is readily effected by gating strings of pulses on the occurrence of modulation pulses and measuring the intervals by comparing the number of pulses gated on an equal-not equal basis. Such comparing circuits are frequently a part of central processing equipment with which input/output apparatus according to the invention is useful. An advantage of pulse counting comparison is found in the weighting of acceptable matching to unacceptable. Simple circuitry can be used to reject a match deemed too far from equal for the purpose intended.

Figures 4, 5, 6, 7:
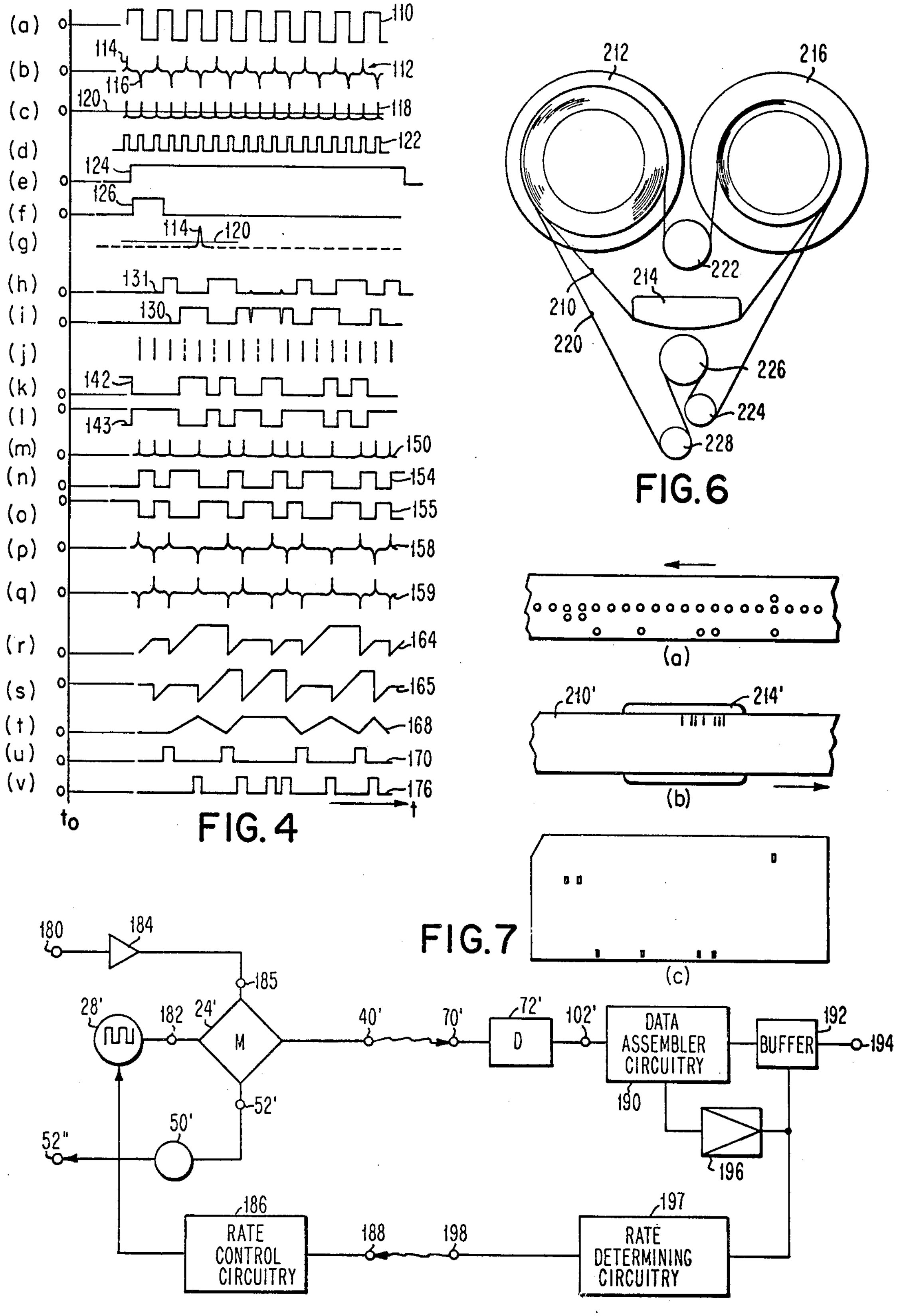
FIG. 4 is a graphical representation of waveforms useful in understanding the functioning of the apparatus illustrated in FIGS. 2 and 3.
FIG. 5 is a functional diagram of an adaptive rate transmission communication system according to the invention.
FIG. 6 is an illustration of a conventional magnetic tape record media apparatus operable with retrospective pulse modulation according to the invention.
FIG. 7 depicts an alternate manifestation of the retrospective pulse modulation and a simple means for addressing magnetic tape based on the invention.

The operations of the modulator 24 and the demodulator 72 will be clearly understood with reference to the graphical representation of waveforms shown in FIG. 4. A square wave 110 produced by the square wave generator 28 is shown in FIG. 4*a*. This wave is applied to the differentiating circuit 30 to produce a wave 112 having positive going spikes 114 and negative going spikes 116 as shown in FIG. 4*b*. This wave is applied to a full wave rectifier 32 from which a wave 118 having positive going spikes only emanates as shown in FIG. 4*c*. From this latter wave, a gating wave 120 as shown in FIG. 4*d* is obtained by the shaping circuit 50. This latter circuit is functionally contemplated by a clipping circuit for reducing the amplitude followed by a high-gain amplifier circuit and preferably thereafter by a regenerating circuit (such as a bistable reciproconductive circuit) to provide a square wave based on the broader lower portions of the pulse wave 118 below a clipping level line 120. An enlarged example of the development of the square wave pulse from a spike is shown in FIG. 4 *g* in the timed relationship described. The first four waves are shown in idealized form having precise amplitude and precise interval for clarity and understanding the operation of the circuitry described above, however, it should be noted at this point that it is an advantage of the invention to translate information accurately with less accurate waveforms produced by less expensive and less critical apparatus. The wave 118 is a uniform, continuous pulse wave. At the time it is desired to modulate the uniform continuous wave 118 according to the invention, the terminal 42 is brought up to a level as shown by modulation gating level wave 124 of FIG. 4*e*. At the time the wave 124 first comes up, the monostable reciproconductive circuit 46 is triggered to produce a change of levels at one output terminal represented by the wave 126 in FIG. 4*f*. Information represented by the pulses 11–21 are applied in time sequence to the input terminals 61 and 60 in conventional manner. Readily adaptable conventional apparatus for this purpose comprises an entirely conventional shift register having output lines coupled to the terminal 60 and 61 and a shift line coupled to the terminal 52 for translating levels 130 and 131 as represented in FIG. 4*h* and *i*. FIG. 4*j* illustrates the modulation of the uniform continuous pulse wave for conveying the information represented by the information pulses 11–21 in the time relationship according to the invention. The curves 142 and 143 shown in FIG. 4*k* and *l* are the waves that appear at the terminal 66 and 68 of the last pulse pegging reciproconductive circuit 58 for operating the gating circuits 54–57 as described. The resulting output wave at the output terminal 40 is represented by the wave 150 shown in FIG. 4*m* which wave is translated by conventional means to the input terminal 70 of the demodulator 72.

From the input terminal 70, wave 150 is applied to the input switch and reciproconductive circuit 82 from the output terminals of which complementary pulse waves 154 and 155 are obtained as shown in FIG. 4*n* and *o*. These waves are differentiated by circuits 94 and 96 to produce resetting pulse waves 158 and 159, respectively, as shown in FIG. 4*p* and *q*. In accordance with this switching and resetting, the ramp generators 84 and 86 produce output waves 164 and 165 as shown in FIG. 4*r* and *s*. These waves are applied to the differential amplifier-type comparing circuit 88 whose output terminal 90 produces a wave illustrated in FIG. 4*t* by the line 168, the upper and lower extremities of which represent the values corresponding to unequal and equal values, respectively, of the ramp generator wave 164 and 165. Waves 170 and 176 represented in FIG. 4*u* and *v* are the output waves at terminals 98 and 102, respectively.

From these waves, the fundamental advantages of the modulation according to the invention become evident. Perhaps the most obvious conclusion from a glance at the waveform is that the ramp generators 84 and 86 need not be at all linear but merely follow the same mathematical expression with respect to time. Actually the tolerance of circuitry used in apparatus according to the invention is such that mass production circuitry is entirely adequate for nearly all applications of the invention. If the frequency of the generator 28 tended to drift, the wave 110 would drift timewise accordingly and the subsequent waves shown would drift in corresponding fashion. This way the ramp waves would still compare in corresponding fashion to a high degree from pulse to pulse as shown in the foregoing example where only the spacing distance between the preceding two pulses is compared with the spacing between the two pulses under consideration. In some instances, utilization circuitry and other circuitry of apparatus to which the invention is applied may call for retrospective comparison of not the immediately preceding spacing but one several spacings earlier. Suitable holding and delaying circuitry of conventional form is applicable to such an arrangement. Less drift can be tolerated, obviously, but the overall objects of the invention are still obtained in such a form of retrospective pulse modulation. Deliberate and wide changes in frequency are contemplated in many applications of retrospective pulse modulation according to the invention.

An example of one such application is shown in FIG. 5 depicting the essentials of an adaptive rate communications system employing retrospective pulse modulation according to the invention. A modulator 24′ which may be essentially the same as that shown in FIG. 2 is supplied at carrier train input terminals 182 with a square wave oscillation from a generator 28′. The modulating information is applied at modulation information input terminals 180 by way of translating circuitry 184, which may be amplifying circuit, signal shaping circuits, a clipping circuitry or other circuitry as necessary for readying the information for blanking or passing pulses at the modulating control input terminals 185. The generator 28′ need differ only from that previously described in that the pulse repetition rate can be varied by means of rate control circuitry 186 to which a controlled level is applied at control level input terminals 188. Such generator and control circuitry are known for varying the rate of a square wave oscillator. The most common example of this arrangement is an astable reciproconductive circuit having the rate determined by varying one of the energizing potential levels. The rate control circuitry may be a tapped voltage divider and electronic switch assembly for selecting one of several discrete values of energizing potential for the generator 28′. Synchronizing or shifting information obtained at the terminal 52′ of the modulating circuit 24′ are available at terminals 52″, suitable shaping circuitry 50′ or other circuitry of conventional form for modifying the shift control pulses and the like may be interposed between the terminals 52′ and 52″. The output terminal 40′ delivers the retrospective pulse modulated wave to suitable transmitting terminal equipment for carrier communications, electrical or optical wave transmissions, wire transmission, radio transmission and the like to complementary receiving terminal Facilities connected to input terminal 75 of a demodulating circuit 72′ which may be that shown in FIG. 3 hereinbefore. The demodulated signal is available at output terminals 102′ for application to data assembler circuitry 190 wherein the data is assembled and translated to circuitry using conventional form of data for handling in a handling circuit 192 and delivery to data output terminals 194. An error detecting circuit 196 is connected to the data assembler circuitry 190 and to the handling circuitry 192 for preventing data recognized as erroneous from occurring at the output terminals 194. Such circuitry is well known and need not be described further. The output of the error detecting circuitry 196 is brought to terminals 198 for application to transmitting terminal facilities to convey a rate control signal to receiving terminal facilities to which the control level input terminals 188 are attached. The carrier terminal facilities may be similar to those described above as the situation dictates. The arrangement is depicted in simplest form for clarity in understanding the concept here. Actually a modulator and demodulator would be installed at each station and the transmission multiplexed therebetween in conventional fashion except for the type of modulation used being that according to the invention. In this arrangement, the generator 28′ and the rate determining circuitry 197 initially are operating at a given rate. The absence of error signals from the error detecting circuitry 196 is translated in the rate determining circuitry 197 to call for the maximum rate and the presence of error signals translated to call for an appropriately reduced rate. A correspondingly appropriate signal at the terminals 198 is delivered to the terminals 188 causing the rate control circuitry 186 to decrease the pulse recurrence rate of the generator 28′. While theoretically the continuous rate of change may be used directly, it is contemplated that in view of years of communications experience the rate determining circuitry 197 and rate control circuitry 186 shall operate in discrete steps. A description of such an adaptive rate communications system and the "Clocking Pulse Rate Detection Circuitry" problem solved by this invention is described in U.S. Pat. No. 3,371,225 to John R. Featherston issued on the 27th of February, 1968. Circuitry based on the stepping rate is known in many forms and can be adapted for the purposes of the arrangement shown.

Another application of the invention is in magnetic medium recording and reproducing. The invention is applicable to the storage media in substantially all its various forms. An example of such an application is found in the "Direct Access Data Storage" apparatus described in U.S. Pat. No. 3,378,827 issued to Fredrich Rudolph Hertrich on Apr. 16, 1968. This apparatus comprises a plurality of interchangeable magnetic strip record bins, each bearing a magnetic label which is scanned by control station apparatus for routing to a recording and/or reproducing station. The speed variations of which apparatus are such that the coding of the invention is of great advantage both in the accessing of the bins and in the recording and/or reproducing of addresses on the magnetic strip records stored in the bins. The versatility of the invention particularly is emphasized in a magnetic tape recording and reproducing system of the type wherein blocks of information are reproduced at a relatively low reproducing speed as required. The particular block to be produced is located by searching for it at a relatively higher speed. The prior art apparatus suffers from disadvantage in the region between the high and the low speed as the tape is nearing the location of the block of information to be reproduced. An example of this type of apparatus is found in U.S. Pat. No. 3,435,310 issued on the 25th of Mar., 1969 to Edward Franklin Bradley. While tone burst recording and counting has proven satisfactory in many instances, these prior art arrangements require extensive circuitry and require considerable record space for accomplishing the desired function. Retrospective pulse modulation according to the invention greatly simplifies these problems.

Referring to FIG. 6, a known configuration of strip record medium transport is shown schematically. This configuration is described in U.S. Pat. application Ser. No. 766,424 of Dale Darwin Decker et al, which matured on the 26th day of May, 1970, as U.S. Pat. No. 3,514,049, for "Strip Record Medium Contact Belt Driven Transport." This arrangement is frequently used with magnetic tape as the strip record medium and operated in a searching mode at speeds up to fifty times that used in the reproducing mode. The embodiment of the invention will be so described with the clear understanding that other strip record media may similarly be transported according to the invention by those skilled in the art. A length of magnetic tape 210 wound on a supply reel 212 is guided past an electromagnetic transducer 214 and wound on a takeup reel 216. The tape 210 is transported by means of a driving belt 220 passing over the tape on the supply reel 212, a drive capstan 222, the tape on the takeup reel 216, a roller 224, another roller 226, and a further roller 228. The drive capstan 222 is most frequently arranged as shown to insure a large area of contact between the driving belt 220 and the tape 210 on the reels 212 and 216. At the same time, one or both rollers 224 and 228 are arranged in known fashion to maintain substantially constant tension in the belt 220. The roller 226 is frequently an idler roller but in some arrangements, the roller 226 is also constituted as an additional drive capstan, with the rollers 224 and 228 arranged to insure a large area of contact of the tape 220 with the auxiliary drive capstan 226. In the latter case the peripheral speeds of the drive capstans 222 and 226 differ by a small percentage (the capstan 222 being the faster) so that constant tension is maintained in the tape 210 as it passes over the electromagnetic transducer 214; the tension also serving to hold the tape 210 firmly in place at all speeds.

A fundamental method of preparing magnetic tape with retrospective pulse modulated addresses according to the invention utilizes a punched paper tape as shown in FIG. 7. A simple manual control punch may be used to set up a multiple of addresses in a punched paper tape, as for example, that shown in FIG. *7a.* Where the tape punching facilities are arranged for punching a plurality of holes transversely in the tape, as is almost invariably the case, start and reference punches and end of address block punches preferably will be placed in rows different from the address number punches as shown. This facilitates circuit arrangements for controlling the movement of the paper tape, as well as visual observation, and the recording of corresponding information magnetically on the magnetic tape. Thus, manifestations of the retrospective pulse modulation appearing as apertures in a card record medium are translated into magnetic marks on length of magnetic tape, as shown schematically in FIG. *7b.* Master address paper tapes can easily be prepared and used in any number of magnetic tape recording situations. Also, Information Bearing Matrix (IBM) cards may be prepared in the manner of short lengths of paper tape where the accommodations for such are available and in the absence of paper tape punching apparatus. The IBM cards in addition offer much more flexibility than does paper tape and are only slightly more complex in preparation. Photographic film, especially of the motion picture lengths, may be used to advantage here. The life of such medium is long and the storage volume is small. By manifesting the information between bars running transversely of the film, optically scannable manifestations of the coding can be used as labels and the like as will be described hereinafter. In this manner both magnetic record and printed record masters are consolidated in one medium. Conventional motion picture editing and printing equipment lends itself to these applications. For more advanced situations, electronic pulse train generating circuitry, along the lines previously described to address magnetic tapes simultaneously with the recording of other information in audio frequency, video frequency, and digital modes. Electronic control circuitry for so doing is well within the province of those skilled in the art.

Figure 8:
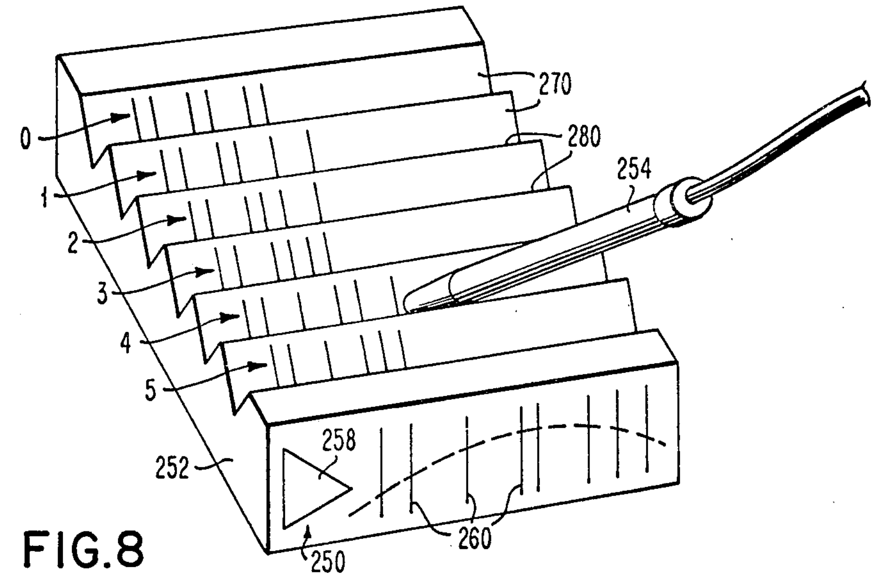
FIG. 8 illustrates the use of a hand-held optical scanner device with bar coding according to the invention.

Retrospective pulse modulation offers advantages in the optical data recognition art. For example, a label 250 shown in FIG. 8 on the near side of a rectangular object 252 of generally rectangular configuration can be scanned manually by a probe 254 containing an optical device for sensing the difference between the background and the marks on the label. Such an arrangement would be extremely handy in a merchandising enterprise. Labels attached to each article for sale identify that article and initiate computer assisted operations in the merchandising organization for performing all the necessary calculations, printing a sale slip for the customer listing the date of purchase, a brief identity of the items, quantity of each, price each and extended together with a total price. At the same time, inventory and sales records are generated and/or updated. As with the magnetic storage medium arrangements previously described, the optical systems do not require synchronizing and/or speed control. The operator, such as a checker, merely passes the tip of the probe 254 over the label in the direction indicated by the arrowhead 258 and across the bars 260. While uniform rate and direction of movement is recognized as desirable, variations normal in human endeavor will not affect the translation of the bar data to electric pulse data in accordance with retrospective pulse modulation on the label. An aspect of the invention that should not be overlooked is the freedom of transducing data several times without adding the errors. An example of a practical operation is the optical scanning of labels manually for recording the resulting data on a magnetic tape recorder of low speed regulation and later entering that data into a central computing system having an entirely different range of speed and much tighter regulation. At the present time, bar coding is accomplished at 40 bars to the inch. Extremely good results are obtained with this coding. In practice each package preferably bears a label such as the label 250 and the sales clerk merely runs a probe 254 over the label. For items on which it is not possible to place such a label or where the access to the label is difficult, or where additional information is to be entered, a simple keyboard may be used instead of the label. Such a simple keyboard is illustrated by the object 252 and the label may be a keyboard or checker identification number. A plurality of surfaces 270 have bar codes for letters and numbers, and if desired, special characters or symbols. The probe 254 is brought across the corresponding surface as though it were on a label. In the interest of compactness, the bars are reduced in height and the probe 254 is drawn across the bars by guiding against ledges 280 at the crest of the saw-tooth crossection of the keyboard device 252. Thus, expensive keyboard devices are obviated and no additional circuitry or components are needed to accommodate articles on which labels are difficult to place or use.

Figure 9:
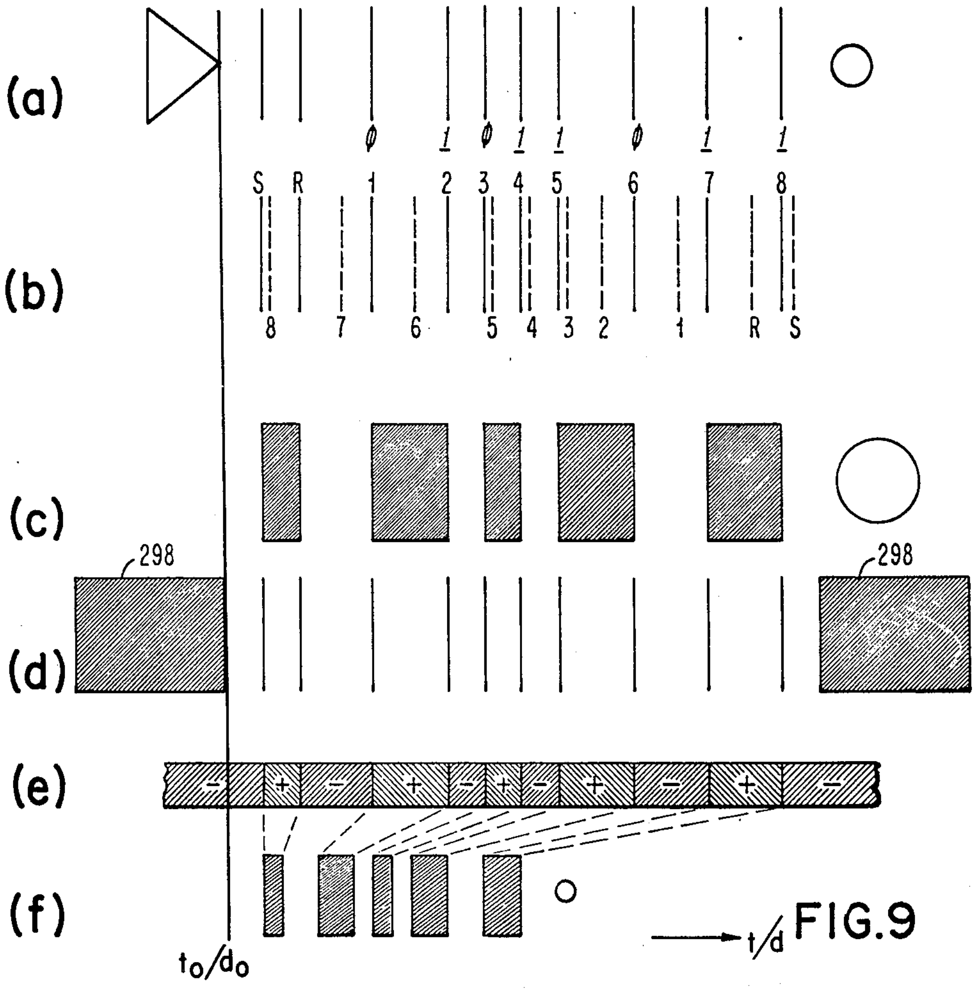
FIG. 9 is a graphical representation of alternate bar coding arrangements according to the invention.

FIG. 9*a* shows a layout of a label such as previously described. The arrowhead is used to indicate the direction in which the scan should be made where there is manual control over the scanning. Scanning from the other end of the label will result in mutilated data or gibberish at the outset. However, it is possible to use circuitry for sensing whether the direction is normal or inverse and treating the data accordingly. Such an arrangement does not necessarily complicate the apparatus unduly. The addition of a single bar to the label in the form of a start bit at the end is sufficient. The processor is arranged eventually to reverse the message. The extra bar is justified, however, where the item and the label may provide the opportunity to scan in an initial direction or in but one direction only whether forwards or backwards. Such an arrangement is found in magnetic tape address searching, for example, where the tape may be passing in one of two directions where reversal is possible were it otherwise necessary. The limiting situation is had, for example, in identifying railroad cars passing by a sensing unit at a traffic control station.

Another solution to this problem encompasses dual coding in differential manner so that the scan is always made in the proper direction regardless of the direction of the item. On a railroad car, for example, bars of two different colors, both contrasting well with the background, are contemplated. The bars of the different colors are offset slightly from each other in the form shown at FIG. 9*b*. Other configurations may be used, such as dots of two colors interposed in the transverse direction, if desired; with which it is not necessary to offset at all. Color filters in the probe will direct the light properly for producing the output pulse trains. Predetermined start and reference bar code combinations are contemplated for initializing the circuitry for operating on the particular color bar codes.

Alternately different colors are contemplated for the interval or color different between manifestations in the form of transition marks. Two successive intervals of the same color denote a binary unit (1) and successive unlike colors a (0). Reversible coding is had with two more colors. Each pair of colors serves as marks for the other colors. This is one example of using the penultimate interval for the reference interval.

Different colors having different frequencies, the interval manifested can be considered frequency. Extending this principle to audio and radio frequency energy is well within the skill of the artisan.

The bar coding described hereinbefore is readily manifested in light and dark line segments on a raster type Cathode Ray Tube (CRT) display. Such an arrangement is useful in Computer Assisted Instructional education systems. Such displays conventionally are generated from binary data stored in programmed storage apparatus. Programming a segment of the display in a bar code is readily accomplished by conventional programming procedures. The bar code is then read by a probe having a nose sufficiently large to be placed over the display segment containing the bar coding. A mechanical plunger closes an electric switch on being pressed against the face of the CRT in conventional fashion for indicating actuation and then causes a spring loaded mirror and/or a prism to scan the bar code beneath the nose of the probe or pressure is continued by the student. At the end of travel the switch is reopened and the scanning is completed. The probe must then be lifted from the CRT face before scanning again.

Optical recognition bars of substantial width will provide pulses at the transitions between bar and background. In an alternate form of the bar code, the spacing between transitions forms the retrospective pulse code as shown in FIG. 9*c* where the same information is coded as in the two preceding lines. A similar arrangement useful in magnetic record tracks is illustrated schematically in FIG. 9*e* where the transitions between alternate polarities recorded convey the information. In some instances, labels may be separated from each other by large area bars 298 as shown in FIG. 9*d*. Such an arrangement is useful in chaining data groups as will be described hereinafter in more detail. A shorter label is had with an arrangement of dual width lines or blocks and dual width intervals as shown in FIG. 9*f* and this label is read with a detector sensing both types of transition. Such a detector is described in the co-pending U.S. Pat. application Ser. No. 888,628 of Jerome Danforth Harr, filed on the 29th of Dec., 1969 which matured on the 10th day of Aug., 1971, as U.S. Pat. No. 3,599,151, for "Character Recognition Scanning Apparatus." Other level and/or positive and negative peak detectors will be sufficient and unlikely to respond to smudges or holidays.

As thus far described, retrospective pulse modulation according to the invention comprises start and reference pulses followed by a continuous string of pulses at two different intervals in a binary system of conveying intelligence. The data rate is as good as many of the prior art pulse trained modulation schemes but no better. It affords the important advantage of being self-clocking and is capable of working with synchronous and asynchronous systems with simple interfacing apparatus. For applications where a pulse, a magnetic area, or a bar is inadvertently omitted or background clutter equivalent to the addition of an electric pulse or a magnetic area or a smudge equivalent to a bar occurs, the succeeding digits may be untranslatable. Protection can be afforded in several ways at no greater expense than is encountered in conventional radio-telegraph protected codes. Other advantages are inherent in the various means of protection as will be described. For binary coded decimal numeric data, six consecutive pulses or lines can be arranged to represent the numerals 0 to 15. In an all numeric system, numerals ten to fifteen may be used for control signals or special characters as convenient. For the 26 letters of the English alphabet, characters comprising eight pulses or lines will cover the entire alphameric range with 28 additional combinations for special characters and control signals. It is contemplated that strings of such characters, each character having its own start and reference pulses, be transmitted and an electronic counter be used in the decoding process for each character. The counter is reset so that the pulse used for reset is used as the new start pulse for the next succeeding character. In this manner, only the space between the last bar of one group and the first bar of the next does not carry information.

Because intervals between pulses are compared on an equal-not equal basis, two different encodings are possible for each alphameric character depending on whether the interval between start and reference pulses is narrow or wide. Table I below shows binary coded decimal numbers zero through fifteen in retrospective pulse modulation with two encodings. The reference bars R are aligned in the table for ready comparison of the initial spacing. In the second column, the minimum length encoding is given and the longer length is given in the third column regardless of whether the interval between start and reference pulses is wide or narrow.

Four different free standing sets of codes are actually possible. One code set uses a narrow space as the reference space; one set uses a wide space as the reference space; and another set is the minimum length code set shown in the second column using either the narrow or the wide reference space to minimize code length. The fourth possible set comprises maximum length characters and therefore is the least attractive. An advantage of the code sets over the continuous coding is that "chaining" is not used; each stands along and is not dependent upon its predecessor. Each can be put on a typewriter device and printed as a sequency of Binary Coded Decimal (BCD) characters.

TABLE I

Numeric Data Coding

| Nr. | Minimum | Maximum |
|---|---|---|
| | R | R |
| 0 | \|\| \|\| \|\| | \| \|\| \|\| \| |
| 1 | \| \|\| \|\|\| | \|\| \|\| \| \| |
| 2 | \|\| \|\|\| \| | \| \|\| \| \|\| |

Table I – Continued

Numeric Data Coding

| Nr. | Minimum | Maximum |
|---|---|---|
| | R | R |
| 3 | \|\| \|\|\|\| | \| \|\| \| \| \| |
| 4 | \| \|\|\| \|\| | \|\| \| \|\| \| |
| 5 | \|\| \| \|\|\| | \| \|\|\| \| \| |
| 6 | \| \|\|\|\| \| | \|\| \| \| \|\| |
| 7 | \| \|\|\|\|\| | \|\| \| \| \| \| |
| 8 | \|\|\| \|\| \| | \| \| \|\| \|\| |
| 9 | \|\|\| \|\|\| | \| \| \|\| \| \| |
| 10 | \|\|\| \| \|\| | \| \| \|\|\| \| |
| 11 | \| \| \|\|\|\| | \|\|\| \| \| \| |
| 12 | \|\|\|\| \| \| | \| \| \| \|\| \| |
| 13 | \|\|\|\| \| \| | \| \| \| \|\|\| |
| 14 | \|\|\|\|\| \| | \| \| \| \|\|\|\| |
| 15 | \|\|\|\|\|\| | \| \| \| \| \| \| |

This means a more simplified printing device can be used, even such as a set of rubber stamps or a set of stencil plates as woould be used to paint a label on a railroad car.

The resulting label is longer since each character in order to stand alone must contain its own start-reference spacing as well as the appropriate spacing between characters. Decoding a string of such encoded characters requires pegging the number of bars scanned: every six bars represent a character as the data bits 1 and 0 are read; the first four are read as character, the next two are ignored, the next four are a character, the next two are ignored, and so on. Where the means separating characters in a string of free standing characters is a counter, however, the entire string of characters is misread if a bar is lost or gained. There is no way to determine if a given group of six lines is indeed a character grouping. A checking feature is to construct the message string or print the label so that the space between character codes is at least twice as large as the widest last bit space in the code character as shown in Table II below showing an example of a three digit number encoded. Line A is the decimal number 017 corresponding to the coding at line B while the binary data delivered to the data processing system is shown at line C. Discarded bits are shown at line D. This will always insure that there are two zeros between each character which are ignored in sending data to the processor.

TABLE II

| | | | |
|---|---|---|---|
| A | 0 | 1 | 7 |
| | R | R | |
| B | \|\| \|\| \|\| | \| \|\| \|\|\| | \| \|\|\|\|\| |
| C | øø øø | ø øø øø1 | ø øø111 |
| D | | ø ø | ø ø |

Table III below shows characters whose codes can be free standing or can be "chained." Each character code is to be the same length as that of any other character. This is accomplished by realizing that the wide spaces within different characters need not be exactly the same. For example, the wide space in character 2 is the normal spacing of twice that of the narrow space, but the wide space in character 3 has been selected so that the character code is the same overall length as all of the rest. Characters 3, 7, 9, 12, 14 all contain this extra wide space. Since character 15 has no wide space, the narrow spaces are equally expanded to fill the length. Because of the nature of the decoding circuitry, these variations in spacing within a string of characters are completely acceptable. The circuitry is arranged to detect spacings that are the same or different from the retrospective spacing on which the coding is based. The code set includes a start-reference space for each character and therefore they may be printed as a series of free standing characters.

This character code set, because each character is a predetermined fixed length, can be "chained" to reduce the overall label length. Table IV below shows a standard string of characters of varying length at line F as typed using a fixed spacing escapement (as opposed to proportional escapement) typewriter. At line K, the table shows a method in which the first bar of one character is superimposed on the last bar of the preceding character. In essence, it has removed one data bit from the coding for each character.

TABLE III

<table>
<tr><th>No.</th><th></th><th>Uniform</th></tr>
<tr><td>0</td><td></td><td>|| || ||</td></tr>
<tr><td>1</td><td></td><td>| || |||</td></tr>
<tr><td>2</td><td></td><td>|| ||| |</td></tr>
<tr><td>3</td><td>+</td><td>||  ||||</td></tr>
<tr><td>4</td><td></td><td>| ||| ||</td></tr>
<tr><td>5</td><td></td><td>|| | |||</td></tr>
<tr><td>6</td><td></td><td>| |||| |</td></tr>
<tr><td>7</td><td>+</td><td>|  |||||</td></tr>
<tr><td>8</td><td></td><td>||| || |</td></tr>
<tr><td>9</td><td>+</td><td>|||  |||</td></tr>
<tr><td>10</td><td></td><td>||| | ||</td></tr>
<tr><td>11</td><td></td><td>| | ||||</td></tr>
<tr><td>12</td><td>+</td><td>||||  ||</td></tr>
<tr><td>13</td><td></td><td>|||| | |</td></tr>
<tr><td>14</td><td>+</td><td>|||||  |</td></tr>
<tr><td>15</td><td>±</td><td>| | | | | |</td></tr>
</table>

TABLE IV

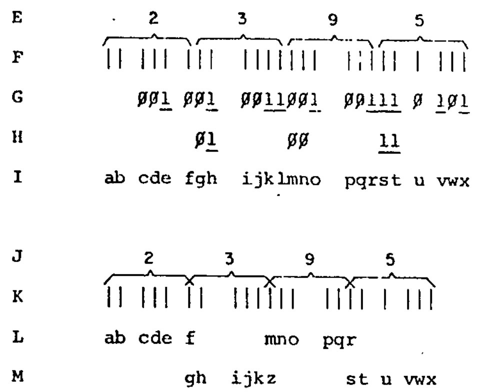

The decoding circuitry uses the first four data bits and discards the fifth of each character. The fixed length code saves 14% in label length as well as 14% in data transmission time and computer handling time.

As mentioned previously, in item label and like applications using the retrospective pulse coding according to the invention, a means of easy and rapid printing is of the essence. Table V below shows coded portions of the decimal numbers 0–9 for use with such a printing device for producing the shortest length label possible for binary-coded-decimal characters. The numbers only are given here in the interest of brevity; alphabetic and special characters are generated in the same fashion and the coding is applicable to both free characters and to "chaining." The last code bar spacing of a character is used as a starting reference for the next character in the latter mode. A simple hand printing device comprises a plurality of type bands or wheels having all the characters desired in both forms shown in Table V on each band or wheel. Manually the wheels are aligned as to succeeding characters in decimal notation by inspection and in proper RPM coding as to wide and narrow reference spacing. The latter is also accomplished by inspection due to the following construction. Each number (character) is preceded and followed by a half circle which matches a similar and complementary half circle of the preceding number and another for matching and complementing a half circle of the following number (or character) to be chosen.

TABLE V

<table>
<tr><th>Nr.</th><th colspan="3">Narrow</th><th colspan="3">Wide</th></tr>
<tr><th></th><th>SRabcdefgh</th><th>E/U</th><th>Shift</th><th>SRabcdefgh</th><th>E/U</th><th>Sh</th></tr>
<tr><td>#</td><td>||</td><td>2</td><td>D</td><td>::</td><td></td><td></td></tr>
<tr><td>0</td><td>|| ||</td><td>6</td><td>D</td><td>| || |</td><td>6</td><td>U</td></tr>
<tr><td>1</td><td>|| | |</td><td>7</td><td>U</td><td>| |||</td><td>5</td><td>D</td></tr>
<tr><td>2</td><td>||| |</td><td>6</td><td>U</td><td>| | ||</td><td>6</td><td>D</td></tr>
<tr><td>3</td><td>||||</td><td>5</td><td>D</td><td>| | | |</td><td>7</td><td>U</td></tr>
<tr><td>4</td><td>| || |</td><td>7</td><td>U</td><td>|| ||</td><td>5</td><td>D</td></tr>
<tr><td>5</td><td>| |||</td><td>6</td><td>D</td><td>|| | |</td><td>6</td><td>U</td></tr>
<tr><td>6</td><td>| | ||</td><td>7</td><td>D</td><td>||| |</td><td>5</td><td>U</td></tr>
<tr><td>7</td><td>| | | |</td><td>8</td><td>U</td><td>||||</td><td>4</td><td>D</td></tr>
<tr><td>8</td><td>| || |</td><td>6</td><td>U</td><td>|| ||</td><td>6</td><td>D</td></tr>
<tr><td>9</td><td>| |||</td><td>5</td><td>D</td><td>|| | |</td><td>7</td><td>U</td></tr>
</table>

By having black semi-circles and half rings (for making up a "white circle" in the vernacular) the proper wide and narrow spacings are matched. An extension of this principle within the skill of the artisan is available for a machine version. The second column shows the bar code of each type bar for the numerals in the first column when the narrow spaced S–R bars (as shown at line No.) are used to initiate a line of bars. Note the alignment of the bars in the column with respect to the No. key. The fifth column shows the bar arrangement of the type bar (usually allotted to an "upper case" character) for that number in the first column when a wide spacing is used for reference (that is, when the last interval of the preceding coded character is a wide interval). The wide spacing is indicated by the dotted lines (: :) to show the alignment but not even these dots appear on the type bar. The narrow start version is printed with the typewriter shift key down and the wide start elements are printed with the shift key up as indicated in the fourth and seventh columns. When a character is printed with an ending space which is wide, the typewriter is manually or automatically shifted up. This is accomplished automatically by adding a tab on the key bar of each print bar ending with a wide spacing. As the print bar returns from printing, the tab is arranged to trip the shift lever of an electric typewriter to shift the type segments to the shift up position. The escapement is proportional to the length of the coded type bar in this arrangement as evidenced by the numbers of units of escapement given in the third and sixth columns. An example of a BCD number 9417 is shown in Table VI below; the separating bars are indicated at line P. The need for proportional escapement is obviated by an uniform length code pattern. This is possible since the wide spaces need not be exactly twice that of the narrow spaces nor that even the same length within a chain of characters as previously noted. To make each pattern the same length, wide spaces are expanded to whatever width is required to fill the specified length. The need for shift control is obviated by code patterns for characters beginning with narrow S–R bar spacing and invariably ending with a narrow spacing interval as shown in Table VII below, which shows a preferred set of retrospective pulse modulation codes for the numerals 0–9 only in the interest of brevity. Other characters, such as A–Z and special characters are generated along the same lines. Each character can be "chained" with the preceding character because the required narrow reference start space is always the last space of the preceding character code pattern.

One BCD notation useful here is the 7–4–2–1 base shown in the second column. This bit value combination will be recognized as being one used in "2 out of 5" protected coding. Table VIII below shows an example of a "chained" group of characters from the preceding table forming the number 169.

The code patterns described immediately hereinbefore are reproduceable in optically or magnetically recording media. Frequently one carrier can utilize both.

TABLE VI

| | | | | | |
|---|---|---|---|---|---|
| N | | 9 | 4 | 1 | 7 |
| | SR | | | | |
| O | \|\|\| | \|\| \|\|\| | \|\| \|\| | \| | \|\|\|\| |
| P | \| | \| | \| | | \| \| |

For example, a credit card, a student's registration card or the like can have optically, electrically, magnetically and mechanically readable data, the latter being embossed in the manner of conventional credit cards. The reading apparatus need only have a slotted guideway in which the card is drawn by the holder. Optical, magnetic, electric and mechanical sensing apparatus is positioned internally along the guideway. The magnetic sensors commercially available are entirely suitable where a guide is available for insuring appropriate orientation and means are present for insuring appropriate speed since the conventional inexperienced magnetic recording and reproducing transducers have a more limited range of speed and orientation than the other three types of sensors. Speed is readily controlled by a simple resistor-capacitor timing circuit controlling an electric lock on a gate or an electric switch arrangement actuating an indicator acknowledging proper speed and also entry to the associated data processing system.

It is a decided advantage that a positive pulse or other manifestation is had at every signal transition of the retrospective pulse code modulation apparatus according to the invention. Simple shift register arrangements are sufficient to store the data sequentially appearing in modulation or on demodulation. Clocking pulses and like manifestation of the associated apparatus are used to shift the registers at RPM transition time on call of the interfaced apparatus. Parallel input from and output to the associated apparatus to and from the shift

TABLE VII

| Nr. | B C D N | Uniform | Narrow |
|---|---|---|---|
| # | | \| \| | |
| 0 | Ø Ø Ø Ø | : : | \|\| \|\| |
| 1 | Ø Ø Ø 1 | : : | \| \|\|\| |
| 2 | Ø Ø 1 Ø | : : | \| \| \|\| |
| 3 | Ø Ø 1 1 | : : | \|\|\|\| |
| 4 | Ø 1 Ø Ø | : : \| \| | \|\| |
| 5 | Ø 1 Ø 1 | : : \| | \|\|\| |
| 6 | Ø 1 1 Ø | : : \| \| | \|\| |
| 7 | 1 Ø Ø Ø | : :\| | \| \|\| |
| 8 | 1 Ø Ø 1 | : :\| | \|\|\| |
| 9 | 1 Ø 1 Ø | : :\| | \|\| |

TABLE VIII

| | | | |
|---|---|---|---|
| Q | 1 | 6 | 9 |
| T | \|\| \| \|\|\| | \| \| \|\|\| | \| \|\| |
| V | Ø ØØ1 | Ø 1 1Ø1 | Ø 1Ø |

register is simple, inexpensive and rapid; only the buffering necessary in the opposite exchange is necessary and the circuitry for this though less rapid is likewise simple and inexpensive. Interfacing with both synchronous and asynchronous systems is equally simple.

While the invention has been shown and described particularly with reference to preferred embodiments thereof, and various alternative structures have been suggested, it should be clearly understood that those skilled in the art may effect further changes without departing from the spirit and scope of the invention as defined hereinafter.

The invention claimed is:

1. Retrospective pulse modulating apparatus comprising means for generating a train of impulses at substantially equal intervals therebetween, means for inputting binary information to be conveyed, means for varying the intervals between said impulses in accordance with said binary information to be conveyed, said interval varying means including, means for storing an indication of a preceding interval, and means coupled to said storing means, to said generating means and to said data inputting means for enabling an impulse in relation to a data bit in accordance with both the binary information of that data bit and the duration of the interval preceding that data bit.

2. Retrospective pulse modulating apparatus as defined in claim 1 and wherein said indication storing means comprises a binary reciproconductive circuit.

3. Apparatus for encoding a train of impulses to represent binary information, comprising, a source of said binary information, a source of regularly spaced impulses, output means, gating means coupled to said output means and to said source of regularly spaced impulses for passing at least some of said impulses to said output means, and control means coupled to said source of said binary information and to said gating means effective for selectively inhibiting passage of said spaced impulses to said output means in accordance with said binary information to determine the interval between a pair of said impulses in dependence on both the value of a digit encoded and on the duration of the interval between an associated preceding pair of impulses.

4. Apparatus as defined in claim 3 and in which said control means is arranged for spacing each impulse of said succession of impulses from the immediately preceding impulse by an interval substantially the same as or substantially different from the interval between the associated pair of impulses formed by that preceding impulse and the penultimate preceding impulse in accordance with the binary value to be represented.

5. Retrospective pulse modulating apparatus comprising means for inputting binary information representative of data bits, means for generating a train of impulses, means for varying the intervals between said impulses in accordance with said binary information to be conveyed, including means for storing an indication of a preceding interval, and means coupled to said storing means, to said generating means and to said data inputting means for gating an impulse in relation to a data bit in accordance with both the information of that data bit and the duration of the interval preceding that data bit.

6. Retrospective pulse modulating apparatus comprising means for inputting binary information representative of data bits, means for generating a train of impulses at substantially equal intervals therebetween, means for gating the succeeding impulses in accordance with the appearance of each impulse of given characteristic and of each impulse of opposite characteristic, and means coupled to said inputting means for gating an impulse in relation to a data bit in accordance with both the binary information of that data bit and the duration of the impulse interval preceding that data bit.

7. Retrospective pulse modulating apparatus comprising, a pair of binary data input terminals, a retrospective pulse modulated electric wave output terminal, a modulating AND gating circuit having an output lead connected to said output terminal and a plurality of input leads, a pulse train generating circuit connected to said input lead of said AND gating circuit for applying a train of substantially equally spaced unidirectional pulses thereto, an OR gating circuit having an output terminal connected to a further one of said input leads of said AND gating circuit, and a plurality of input leads, two pairs of AND gating circuits each having an output lead and a multiple of input leads with the output leads of one pair connected in common to another input lead of said OR gating circuit and the output leads of the other pair connected through an inverting circuit to a further input lead of said OR gating circuit, a bistable reciproconductive circuit having a set terminal connected to the output leads of said other pair of AND gating circuits, a reset terminal connected to the output leads of said one pair of AND gating circuits, an errect output terminal connected in common to input leads of one AND gating circuit of each of said pairs, and an inverting terminal connected in common to input leads of the other of said AND gating circuits of said pairs, and electric leads connecting one of said pairs of data input terminals to input leads of one AND gating circuit of each of said pairs of AND gating circuits and connecting the other of said pair of data input terminals to input leads of the other of said pairs of AND gating circuits.

8. Retrospective pulse modulating apparatus as defined in claim 7 and wherein said pulse train generating circuit is a square wave generator.

9. Retrospective pulse modulating apparatus as defined in claim 7 and incorporating circuitry for controlling modulation connected to said modulating AND gating circuit and to said two pairs of AND gating circuits for insuring the production of start and reference pulses at the wave output terminals.

10. Retrospective pulse modulating apparatus as defined in claim 7 and incorporating circuitry connected between said wave output terminal and said two pairs of AND gating circuits for actuating the latter in accordance with the output wave at said wave output terminals.

11. Retrospective pulse modulating apparatus comprising, a pair of binary data input terminals, a retrospective pulse modulated electric wave output terminal, an AND gating circuit having an output lead connected to said output terminal and a multiple of input leads, a modulating control voltage terminal connected to one of said input leads of said AND gating circuit, a square wave generating circuit, a differentiating circuit, and a full wave rectifying circuit connected in cascade to another of said input leads of said AND gating circuit for applying a train of substantially equally spaced unidirectional pulses thereto, a monostable reciproconductive circuit having a trigger terminal connected to said modulating control voltage terminal, a stable output terminal and an unstable output terminal, an OR gating circuit having an output terminal connected to a further one of said input leads of said AND gating circuit, one input lead connected to said unstable output terminal of said monostable reciproconductive circuit, and a plurality of other input leads, two pairs of AND gating circuits each having an output lead and a multiple of input leads with the output leads of one pair connected in common to another input lead of said OR gating circuit and the output leads of the other pair connected through an inverting circuit to a further input lead of said OR gating circuit, a bistable reciproconductive circuit having a set terminal connected to the output leads of said other pair of AND gating circuits, a reset terminal connected to the output leads of said one pair of AND gating circuits, an errect output terminal connected in common to input leads of one AND gating circuit of each of said pairs, and an inverting output terminal connected in common to input leads of the other of said AND gating circuits, a message AND gating circuit having an output lead connected in common to input leads of all of said AND gating circuits of said pairs, an input lead connected to said stable output terminal of said monostable reciproconductive circuit, and another input lead connected through a signal shaping circuit to said wave output terminal, and electric leads connecting one of said pairs of data input terminals to input leads of one AND gating circuit of each of said pairs of AND gating circuits and connecting the others of said pair of data input terminals to input leads of the other of said pairs of AND gating circuits.

12. Apparatus for encoding binary data in a series of succeeding manifestations wherein the first and the second manifestations are spaced apart by a given interval and the binary data follows the given interval with the first bit manifested by a third manifestation following the given interval by a second interval equal to the given interval for encoding binary data of one nature and following the given interval by a second interval unequal to the given interval for encoding binary data of nature opposite that of said one nature, and with each bit thereafter retrospectively based on the preceding interval and the nature of the binary data in the same manner, comprising circuitry for inputting binary data circuitry for producing a train of substantially uniformly spaced manifestations in the form of electric impulses, circuitry coupled to said electric impulse producing circuitry for gating said impulses to manifesting means, circuitry coupled to said gating circuitry and to said inputting circuitry for enabling said gating circuitry, and circuitry coupled to said enabling circuitry for pegging the retrospective gating and arming said gating circuitry accordingly for passing the succeeding impulse from said impulse producing circuitry at the proper time in accordance with said retrospective coding.

13. Retrospective pulse modulating apparatus comprising means for generating a train of impulses at substantially equal intervals therebetween, means for inputting binary information to be conveyed, means for varying the intervals between said impulses in accordance with said binary information to be conveyed, said interval varying means including, means for storing an indication of a preceding interval, and means coupled to said storing means, to said generating means and to said data inputting means for blanking an impulse from said train of impulses in relation to a data bit in accordance with the interval preceding that data bit for one bit of said binary information and for passing an impulse for the other bit of said binary information.

14. Retrospective pulse modulating apparatus comprising means for generating a train of impulses representing binary information, said means including a generator for producing a train of electric impulses spaced at substantially equal intervals, input terminals at which binary information to be conveyed appears, control circuitry coupled to said generator and to said input terminals for selectively spacing said impulses for determining the interval between a pair of impulses in dependence on both the value of a digit to be conveyed and the duration of the interval between an associated preceding pair of impulses.

15. Retrospective pulse modulating apparatus as defined in claim 14 and wherein said control circuitry is arranged for spacing said impulses by inhibiting an impulse in accordance with said determination.

16. Retrospective pulse modulating apparatus as defined in claim 14 and wherein said control circuitry is arranged for spacing said impulses by an interval at which every output impulse is spaced equally or unequally from the immediately preceding impulse.

17. Retrospective pulse modulating apparatus as defined in claim 15 and incorporating a magnetic record medium and an electromagnetic transducer arranged in magnetic recording and reproducing proximity to said magnetic record medium and connected to said generator and said control circuitry for transducing said binary data information at said input terminals to said magnetic record medium.

18. Retrospective pulse modulating apparatus for producing an article having binary coded information thereon comprising a card having a magnetic record medium thereon in the form of a magnetic stripe, digital data inputting means, electromagnetic transducer outputting means arranged in magnetic recording relationship to said magnetic stripe, generating means for producing a train of substantially equally spaced electric impulses, and enabling means coupled to said transducer outputting means and to said generating means and said inputting means for recording transitions in said magnetic stripe that are spaced apart in accordance with both the value of digit recorded and the interval between the preceding pair of transitions.

19. Retrospective pulse modulating apparatus for producing an article having binary coded information thereon comprising a card having a record portion thereon, digital data inputting means, electric current responsive printing outputting means arranged in recording relationship to said record portion, generating means for producing a train of substantially equally spaced electric impulses, and enabling means coupled to said printing outputting means and to said generating means and said inputting means for recording transitions in said record portion that are spaced apart in accordance with both the value of digit recorded and the interval between the preceding pair of transitions.

* * * * *